US008538406B2

(12) United States Patent
Lee et al.

(10) Patent No.: US 8,538,406 B2
(45) Date of Patent: Sep. 17, 2013

(54) METHOD FOR DYNAMIC CHANGE OF OPERATION MODE IN WIRELESS COMMUNICATION SYSTEM

(75) Inventors: Seung Que Lee, Daejeon-si (KR); Hyung Deug Bae, Daejeon-si (KR); Jun Sik Kim, Seoul (KR); Sang Chul Oh, Daejeon-si (KR); Kyong Tak Cho, Daejeon-si (KR); Nam Hoon Park, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/330,547

(22) Filed: Dec. 19, 2011

(65) Prior Publication Data
US 2012/0157077 A1 Jun. 21, 2012

(30) Foreign Application Priority Data

Dec. 20, 2010 (KR) .................. 10-2010-0130704

(51) Int. Cl.
*H04M 3/00* (2006.01)
(52) U.S. Cl.
USPC ......... 455/419; 455/418; 455/434; 455/435.1
(58) Field of Classification Search
USPC .................. 370/328, 330; 455/415, 418, 419, 455/434, 435.1, 435.2, 443, 444
See application file for complete search history.

(56) References Cited

U.S. PATENT DOCUMENTS

| 2009/0305699 | A1  | 12/2009 | Deshpande et al. |
| 2010/0130171 | A1  | 5/2010  | Palanigounder et al. |
| 2010/0214943 | A1* | 8/2010  | Immendorf et al. .......... 370/252 |
| 2011/0218004 | A1* | 9/2011  | Catovic et al. ................ 455/509 |
| 2011/0244870 | A1* | 10/2011 | Lee ................ 455/444 |
| 2012/0028629 | A1* | 2/2012  | Liu et al. .................... 455/422.1 |

FOREIGN PATENT DOCUMENTS

| KR | 1020100034885 | 4/2010 |
| WO | WO 2010/071374 | * 6/2010 |

* cited by examiner

*Primary Examiner* — Wesley Kim
*Assistant Examiner* — Dinh P Nguyen
(74) *Attorney, Agent, or Firm* — Nelson Mullins Riley & Scarborough LLP

(57) ABSTRACT

Disclosed is a method of operating a femto base station (BS) in a wireless communication system, the method comprising: receiving an access request comprising a closed subscriber group (CSG) identifier (ID) from user equipment (UE); determining a number N of UE accessing the femto BS; ascertaining an access type to determine whether the UE is a CSG UE or a non-CSG UE of the femto BS on the basis of the CSG ID of the UE; and determining whether to admit access of the UE on the basis of the access type, the N and access admittable information, the access admittable information comprising $U_{CSG}$, i.e., a maximum number of CSG UE of which access is admitted; $U_{ALL}$, i.e., a maximum number of non-CSG UE of which access is admitted; and $U_{MAX}$, i.e., a maximum number of UE of which access is admitted.

3 Claims, 6 Drawing Sheets

METHOD FOR DYNAMIC CHANGE OF OPERATION MODE IN WIRELESS COMMUNICATION SYSTEM

CROSS-REFERENCE TO RELATED APPLICATIONS

This application claims the benefit of priority of Korean Patent Application No. 10-2010-0130704 filed on Dec. 20, 2010, all of which are incorporated by reference in their entirety herein.

BACKGROUND OF THE INVENTION

1. Field of the Invention

The present invention relates to wireless communications, and more particularly, to a method for providing services by dynamically changing an operation mode of a base station in a wireless communication system.

2. Related Art

In an institute of electrical and electronics engineers (IEEE) 802.16 task group that chooses the next-generation wireless interface standards and a nonprofit worldwide interoperability for microwave access (WiMAX) forum that provides service and network standards for a broadband wireless connection system based on IEEE 802.16, standardization has been being achieved for a wireless connection system supporting a femto cell to enhance efficiency of the system and improve quality of service (QoS) under an indoor environment. The WiMAX forum defines a femto base station (BS) as a low-power inexpensive base station connected to an Internet protocol (IP) network through a fixed wireless link or a local broadband wired link.

The femto BS is connected to the IP network spread in a home or an office, and accesses a core network of a mobile communication system through the IP network, thereby providing mobile communication service. That is, the femto BS may be connected to the core network of the mobile communication system through a digital subscriber line (DSL). A user of the mobile communication system may receive the service in the outdoors through the existing macro cell, but receive the service in the indoors through the femto cell. The femto cell improves indoor coverage of the mobile communication system by making up for that the service of the existing macro cell becomes deteriorated in a building, and provides the service intended for the a specific user, thereby providing voice and data service of high quality. Further, the femto cell can provide a new service not given in the macro cell, and the spread of the femto cell may cause fixed-mobile convergence (FMC) to be accelerated and an industrial-based cost to be reduced.

The femto cell includes a closed subscriber group (CSG) cell that provides services to only a set specific user group, and a non-CSG cell that provides services general users. Here, the specific user group that can receive services from the CSG cell will be called a CSG, and a user who belongs to the corresponding group will be called a CSG user. Further, users other than the CSG users will be called a non-CSG user.

In a wireless communication system supporting the femto cell, there may exist a plurality of femto cells such as the CSG cell, the non-CSG cell, etc. in addition to the macro cell. Thus, interference may occur when a wireless signal is transmitted and received between a base station (BS) and user equipment (UE) of each cell, thereby deteriorating quality of communication. However, this conflicts with the original object of the wireless communication system supporting the femto cell to provide higher quality of services to a user.

Accordingly, there is needed a method for preventing interference between the cells in the wireless communication system supporting the femto cell to provide higher quality of services, and providing services by properly adjusting a service mode in accordance with conditions of the wireless communication system.

SUMMARY OF THE INVENTION

The present invention provides a method for dynamically changing an operation mode of a femto base station in a wireless communication system.

In an aspect, there is provided a method of operating a femto base station (BS) in a wireless communication system, the method including: receiving an access request including a closed subscriber group (CSG) identifier (ID) from user equipment (UE); determining a number N of UE accessing the femto BS; ascertaining an access type to determine whether the UE is a CSG UE or a non-CSG UE of the femto BS on the basis of the CSG ID of the UE; and determining whether to admit access of the UE on the basis of the access type, the N and access admittable information, the access admittable information including $U_{CSG}$, i.e., a maximum number of CSG UE of which access is admitted; $U_{ALL}$, i.e., a maximum number of non-CSG UE of which access is admitted; and $U_{MAX}$, i.e., a maximum number of UE of which access is admitted.

The determining whether to admit the access may include determining to admit the access if the access type is the CSG UE and the N is less than the $U_{MAX}$.

The determining whether to admit the access may include determining to admit the access if the access type is the non-CSG UE and the N is less than the $U_{ALL}$.

The method may further include receiving an operation mode changing instruction from a macro BS; and resetting the access admittable information on the basis of the operation mode changing instruction.

If the operation mode changing instruction indicates an opened mode that provides services regardless of the access type of the UE, the access admittable information may be reset as follows:

$U_{CSG}=0$, $U_{ALL}=U_{MAX}$.

If the operation mode changing instruction indicates a closed mode that provides services to only the CSG UE, the access admittable information may be reset as follows:

$U_{ALL}=0$, $U_{CSG}=U_{MAX}$.

If the operation mode changing instruction indicates a hybrid mode that provides services by distinguishing between the CSG UE and the non-CSG UE, the access admittable information may be reset as follows:

$U_{CSG}=k$, $U_{ALL}=U_{MAX}-U_{CSG}$ (where, k is a constant greater than 0 and smaller than $U_{MAX}$).

In another aspect, there is provided a wireless apparatus supporting a femto cell operation of a wireless communication system, the wireless apparatus including a memory which stores information about an admittable number of UE depending on access types; and a processor which operates by functionally combining with the memory, and wherein the processor receives an access request including a closed subscriber group (CSG) identifier (ID) from user equipment (UE); determines a number N of UE accessing the femto BS; ascertains an access type to determine whether the UE is a CSG UE or a non-CSG UE of the femto BS on the basis of the CSG ID of the UE; and determines whether to admit access of the UE on the basis of the access type, the N and access admittable information, the access admittable information including $U_{CSG}$, i.e., a maximum number of CSG UE of which access is admitted; $U_{ALL}$, i.e., a maximum number of non-CSG UE of which access is admitted; and $U_{MAX}$, i.e., a maximum number of UE of which access is admitted.

The determining whether to admit the access may include determining to admit the access if the access type is the CSG UE and the N is less than the $U_{MAX}$.

The determining whether to admit the access may include determining to admit the access if the access type is the non-CSG UE and the N is less than the $G_{ALL}$.

The processor may receive an operation mode changing instruction from a macro BS; and reset the access admittable information on the basis of the operation mode changing instruction.

If the operation mode changing instruction indicates an opened mode that provides services regardless of the access type of the UE, the access admittable information may be reset as follows:

$U_{CSG}=0$, $U_{ALL}=U_{MAX}$.

If the operation mode changing instruction indicates a closed mode that provides services to only the CSG UE, the access admittable information may be reset as follows:

$U_{ALL}=0$, $U_{CSG}=U_{MAX}$.

If the operation mode changing instruction indicates a hybrid mode that provides services by distinguishing between the CSG UE and the non-CSG UE, the access admittable information may be reset as follows:

$U_{CSG}=k$, $U_{ALL}=U_{MAX}-U_{CSG}$ (where, k is a constant greater than 0 and smaller than $U_{MAX}$).

DESCRIPTION OF EXEMPLARY EMBODIMENTS

In a wireless communication system supporting a femto cell, an operation mode of a femto base station (BS) may be classified into three, i.e., an opened mode, a closed mode and a hybrid mode in accordance with control methods of a user's access. The opened mode refers to an operation mode which provides services by qualifying any user for membership without limiting qualification of a user who wants to have an access to the femto BS and subscribe for the femto cell. The closed mode attaches restrictive conditions to a user's qualification for subscribing for the femto cell, thereby allowing a certain user to subscribe for the cell and receive the services. A group of users who have subscribed for the cell will be called a closed subscriber group (CSG), and a user belonging to the CSG will be called a CSG user. The CSG user is a relative term. For example, someone may be a CSG user with regard to a first femto BS, but may be a non-CSG user with regard to a second femto BS. A hybrid mode, where the opened mode and the closed mode are combined, provides services as the closed mode for the CSG user, but as the opened mode for the non-CSB user.

The operation mode for the femto BS is determined at initial installation. To operate the femto BS as the closed mode, the femto BS may be registered as the closed mode to the system by a contract with an operator, and thus required information may be set up. To provide services in the closed mode, a network may be given a cell identifier (ID) indicating which operation mode the cell operates as among the closed mode, the opened mode and the hybrid mode in the corresponding BS. Also, a CSG ID may be given for indicating a CSG to which a closed-type cell provides services. The same principle as this may be applied to either of an opened-type cell or a hybrid-type cell.

The operation mode, which is set, is maintained until a user has changed the contract with the operator, and thus provides services in one operation mode. The operation mode of the system is continued until a user has changed the contract with the operator, and the services are provided based on this operation mode. The change of the operation mode while operating the system is in need of change of a system parameter and transmission to another node, and thus not allowed in the standards for stably operating the system.

Figure 1:
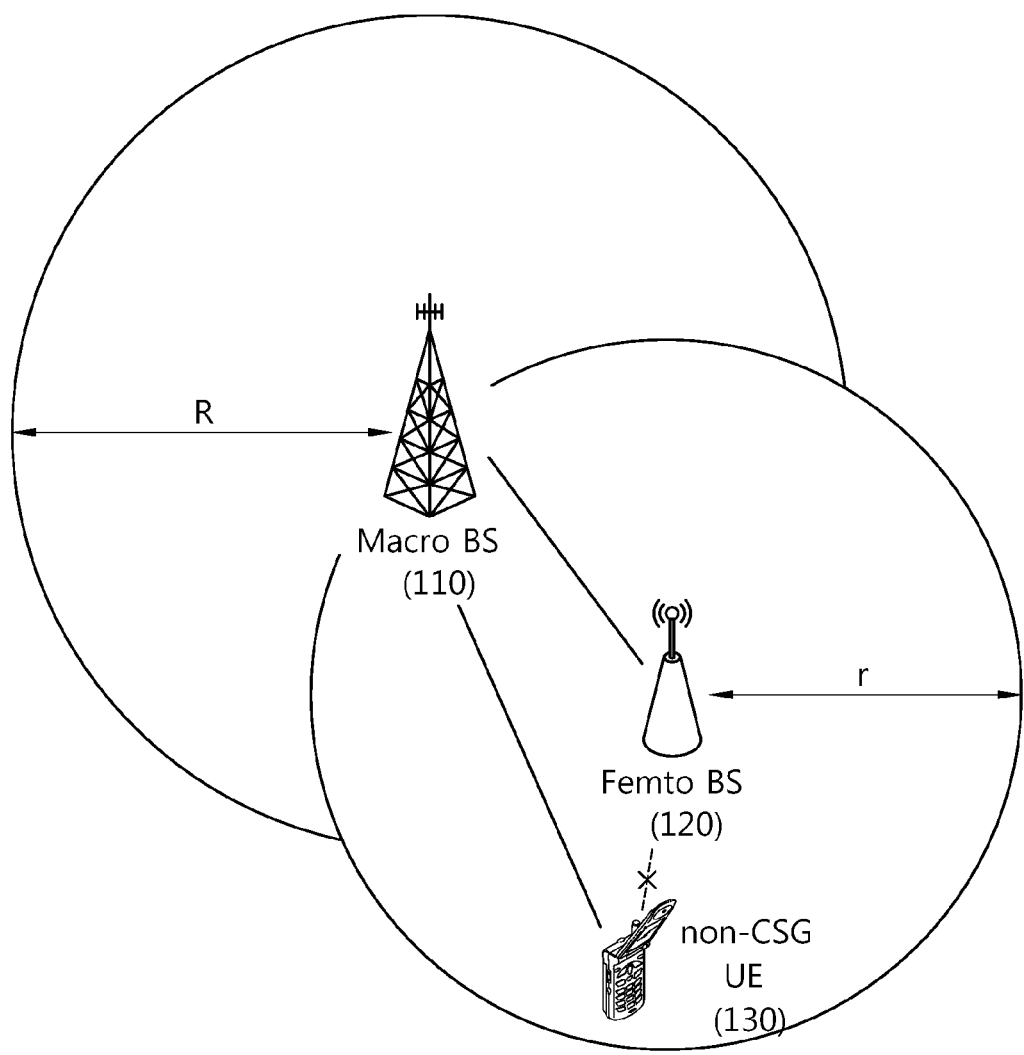
FIG. 1 is a view showing a wireless communication system supporting a femto cell to which the present invention can be applied.

FIG. 1 is a view showing a wireless communication system supporting a femto cell to which the present invention can be applied.

Referring to FIG. 1, a macro BS 110 has a coverage of a radius R. The macro BS 110, to which the femto BS 120 is accessing, is capable of providing services to another BS and user equipment (UE) within the coverage.

The femto BS 120 provides services within a coverage of a radius r. The femto BS 120 can provide services only the UE corresponding to the CSG user since it operates in the closed mode. The femto BS 120 accesses the macro BS 110 and the transmits and/or receives a wireless signal for providing services to the UE.

A UE 130 exists within the coverage R of the macro BS 110 and the coverage r of the femto BS 120. Assume that the UE 130 corresponds to the non-CSG user.

The UE 130 tries to subscribe for the femto BS 120 in order to subscribe for the cell and receive services. The femto BS 120 provides the services in the closed mode, so that the UE 130 corresponding to the non-CSG user cannot access the femto BS 120. Thus, the UE 130 may directly access the macro BS 110 to receive the services. In the drawing, the UE 130 is located within the coverage R of the macro BS 110. However, even when the UE is located out of the coverage of the macro BS 110, the UE 130 may directly access the macro BS 110 by moving and entering the coverage of the macro BS 110.

The UE 130 accessing the macro BS 110 may be located in a femto cell coverage or its vicinity, and transmit a wireless signal to and/or receive it from the macro BS 110. This may cause interference when the femto BS 120 provides services to another subscribed UE or transmits/receives the wireless signal to/from the macro BS.

The hybrid mode is for preventing the interference that may occur as above when the non-CSG user within or near the femto cell coverage directly accesses the macro BS and receives the services. To this end, the non-CSG user is subscribed for its own cell and thus prevented from subscribing for the macro cell and receiving the service. The BS of the cell operating in the hybrid mode provides services to both the CSG user and the non-CSG user, but has to be based on the closed mode. Accordingly, the BS of the hybrid mode receives a service request from a user subscribed for the BS, and distinguishes between the CSG user and the non-CSG user through a membership check, thereby performing differential admission control based on the distinguishment.

Basically, the interference of electromagnetic waves is dynamically varied depending on the location and density of users. For example, the interference may be very great if a lot of users exists in the vicinity of a certain femto BS, but not great if a few of users exists. In the former case, a hybrid cell operation may help the interference control. However, in the latter case, it wouldn't bring any problem to operate the close mode.

Although the interference is dynamically varied, it is impossible to dynamically change the operation mode of the BS. Accordingly, if the dynamically varied interference is reflected in changing the operation mode of the BS, the adaptability of the system may increase.

As above, if the operation mode of the BS is determined at the initial installation and cannot be dynamically changed until it has been reinstalled, this has a disadvantage that the operation mode cannot be adaptive to conditions of the dynamically varied interference. In this exemplary embodiment, there will be proposed a method of dynamically changing the operation mode of the BS with regard to the BS operating in the hybrid mode. Since the standards prohibit the dynamic change in the operation mode of the BS, the present exemplary embodiment changes a cell operation algorithm without departing the principle of the standards, thereby having an effect of changing the operation mode of the BS.

Below, the exemplary embodiments of the present invention will be described in more detail with reference to accompanying drawings. Hereinafter, the term 'UE' will be used as an object that can access the BS and receive the services from the BS as described above, but not limited thereto.

Figure 2:
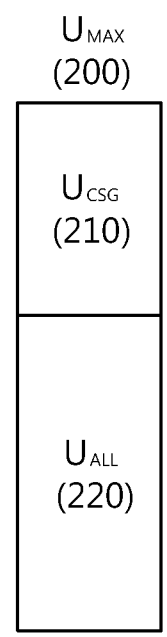
FIG. 2 shows the number of subscribers acceptable in a femto base station operating in a hybrid mode, and their assigned state.

FIG. 2 shows the number of subscribers acceptable in a femto BS operating in the hybrid mode, and their assigned state.

Referring to FIG. 2, $U_{MAX}$ 200 shows a total number of UE maximally acceptable in the femto BS; $U_{CSG}$ 210 shows the number of UE of CSG users (hereinafter, referred to as 'CSG UE') maximally acceptable in the BS; and $U_{ALL}$ 220 shows the number of UE of non-CSG users (hereinafter, referred to as 'non-CSG UE') acceptable in the BS regardless of whether the users belong to the CSG. That is, the $U_{ALL}$ 220 refers to the number of non-CSG UE maximally allowed for the access. Therefore, $U_{MAX}=U_{CSG}+U_{ALL}$. The CSG UE may receive services for the CSG or services for the non-CSG from the femto BS. Thus, the CSG UE, maximally as many as the $U_{MAX}$ 200, may access the femto BS and receive services. On the other hand, the non-CSG UE cannot receive the services for the CSG, and thus can access the femto BS maximally as many as the $U_{ALL}$ 220.

Figure 3:
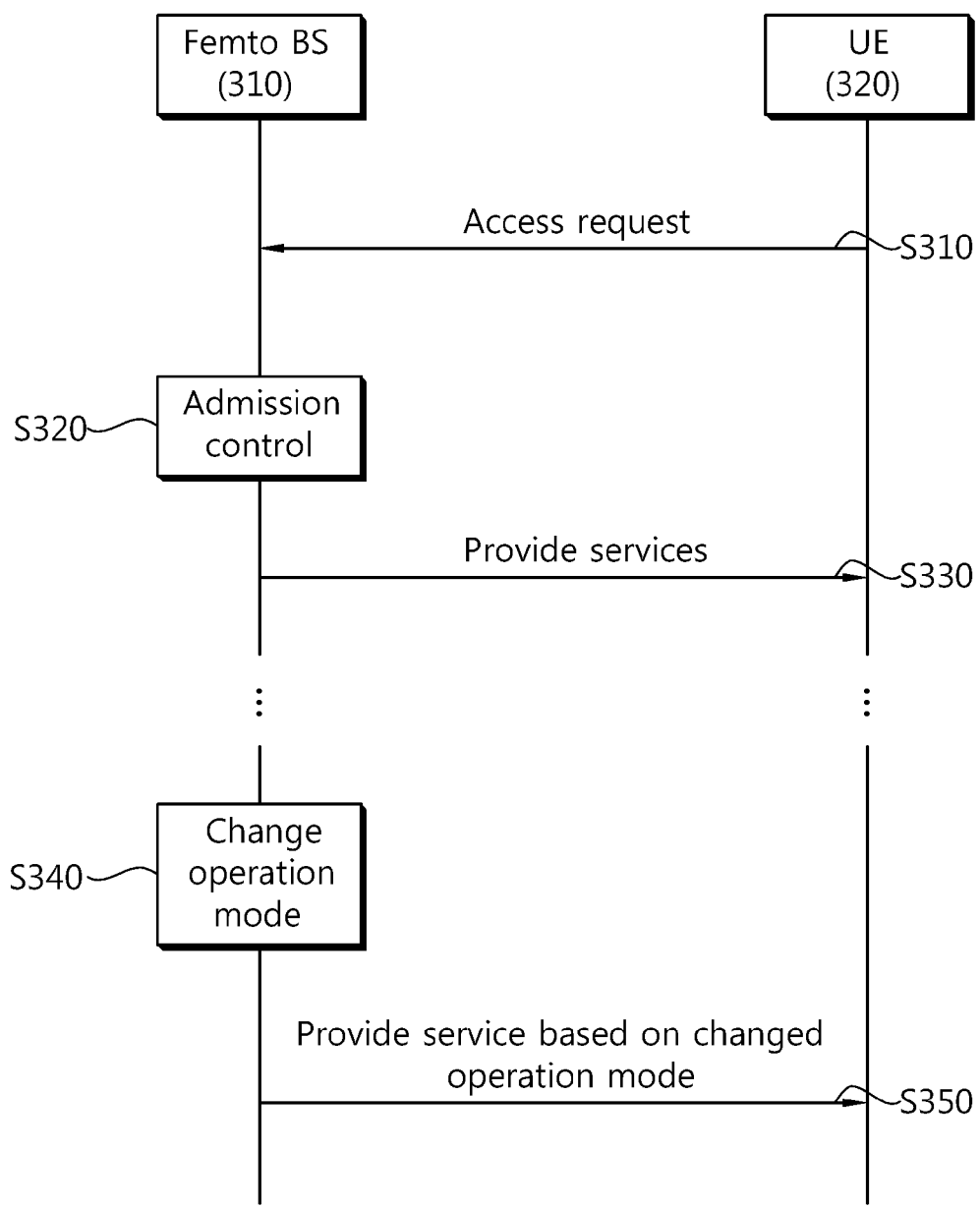
FIG. 3 is a flowchart showing a method of providing services in a communication system supporting the femto base station according to an exemplary embodiment of the present invention.

FIG. 3 is a flowchart showing a method of providing services in a communication system supporting the femto BS according to an exemplary embodiment of the present invention.

Referring to FIG. 3, a femto BS 310 receives a signal for an access request from UE 320 (S310).

The femto BS 310 that receives the signal for the access request performs admission control for determining whether to admit membership of the UE 320. As shown in the drawing, the admission control may be directly performed in the femto BS operating in the hybrid mode, or alternatively preformed in a core network (CN) connecting with the BS. When the admission control is performed in the CN, it may be performed as the femto BS sends the macro cell information about the UE 320 that requests the access.

A mechanism for performing the admission control may be different in accordance with types and/or characteristics or the like of the UE. The admission control (S320) performed by the femto BS 310 will be described in more detail with reference to FIG. 4.

Figure 4:
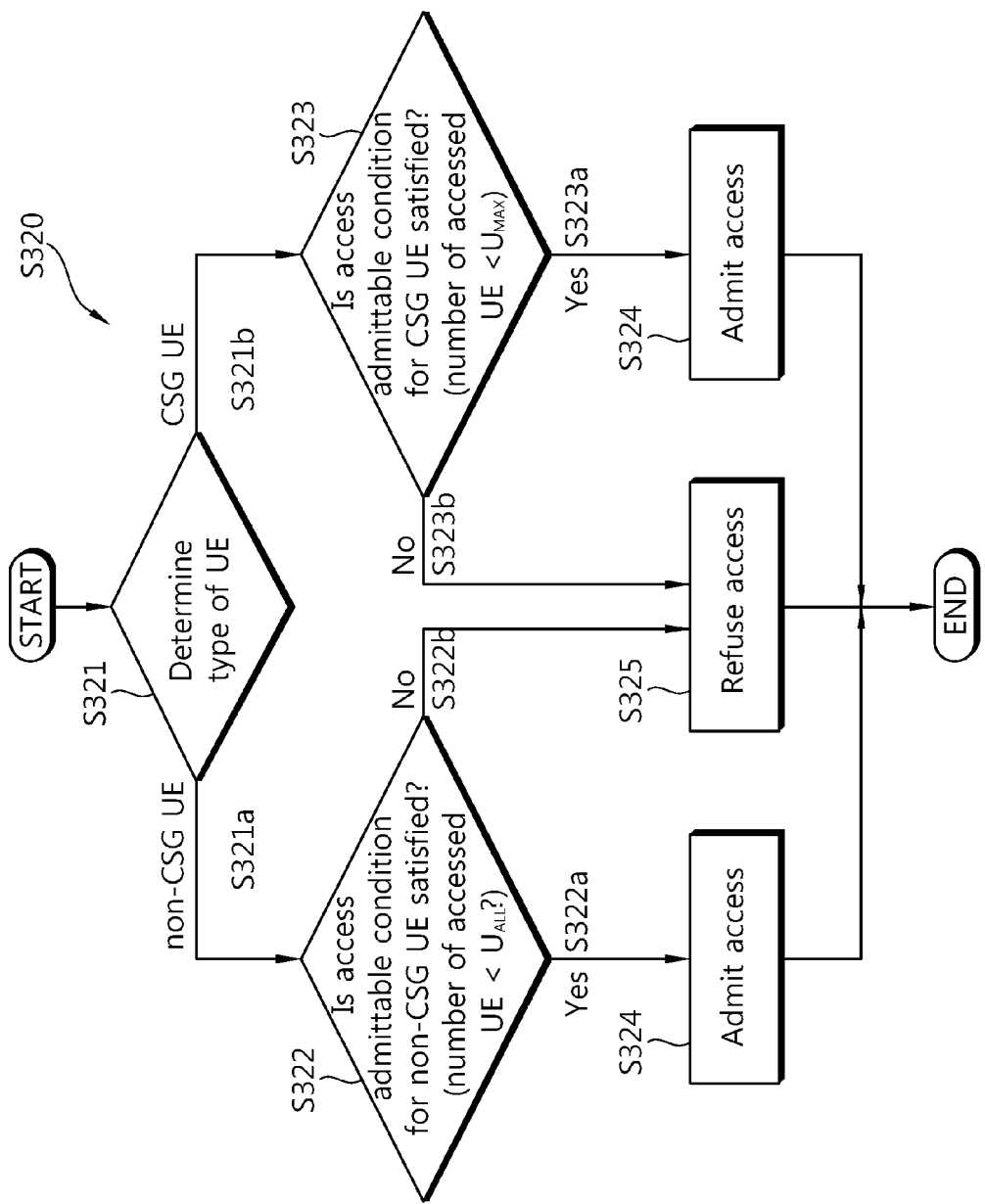
FIG. 4 is a flowchart of an admission control method according to an exemplary embodiment of the present invention.

FIG. 4 is a flowchart of the admission control method according to an exemplary embodiment of the present invention.

Referring to FIG. 4, the femto BS 310 performing the admission control determines the types of the UE 320 that request the access (S321). The UE may be the CSG UE or the non-CSG UE. A method of determining the types of the UE may be based on the CSG ID of the UE 320. If the CSG ID assigned for the femto BS 310 is equal to the CSG ID assigned for the UE 310, the femto BS 310 determines that the UE 320 is the CSG UE. On the other hand, if they are different from each other, it is determined that the UE 320 is the non-CSG UE.

If the UE 320 that request the access is the non-CSG UE (S321a), it is ascertained whether an access condition of the non-CSG UE is satisfied or not (S322). Whether the conditions are satisfied may be ascertained on the basis of whether the number of all UE accessing the femto BS 310 at a time is less than the $U_{ALL}$ 220.

If the conditions are satisfied (S322a), the access of the UE 320 to the femto BS 310 is admitted (S324). Conversely, if the conditions are not satisfied (S322b), the access of the UE 320 is refused (S325).

If the UE 320 that request the access is the CSG UE (S321b), it is ascertained whether an access condition of the CSG UE is satisfied or not (S323). Whether the conditions are satisfied may be ascertained on the basis of whether the number of all UE accessing the femto BS 310 at a time is less than the $U_{MAX}$ 200.

If the conditions are satisfied (S323a), the access of the UE 320 to the femto BS 310 is admitted (S324). Conversely, if the conditions are not satisfied (S323b), the access of the UE 320 is refused (S325).

Referring back to FIG. 3, the femto BS 310 provides services requested by the UE 320 to the UE 320 admitted to access (S330).

If the operation mode of the femto BS has to be changed while providing services to the accessed UE, the operation mode of the femto BS is changed (S340). The operation mode of the femto BS may be changed in accordance with change in the contract between operators, types of the UE requesting the access, the number of UE and/or communication environments of the current system. The operation mode may be changed as receiving an instruction message for changing the operation mode from the macro BS. The operation mode may be changed into a heterogeneous operation mode, and may be changed in the total number of UE, and each admittable number of the CSG/non-CSG UE in the case of the homogeneous operation mode. The change of the operation mode will be described in more detail with reference to FIG. 5.

Figure 5:
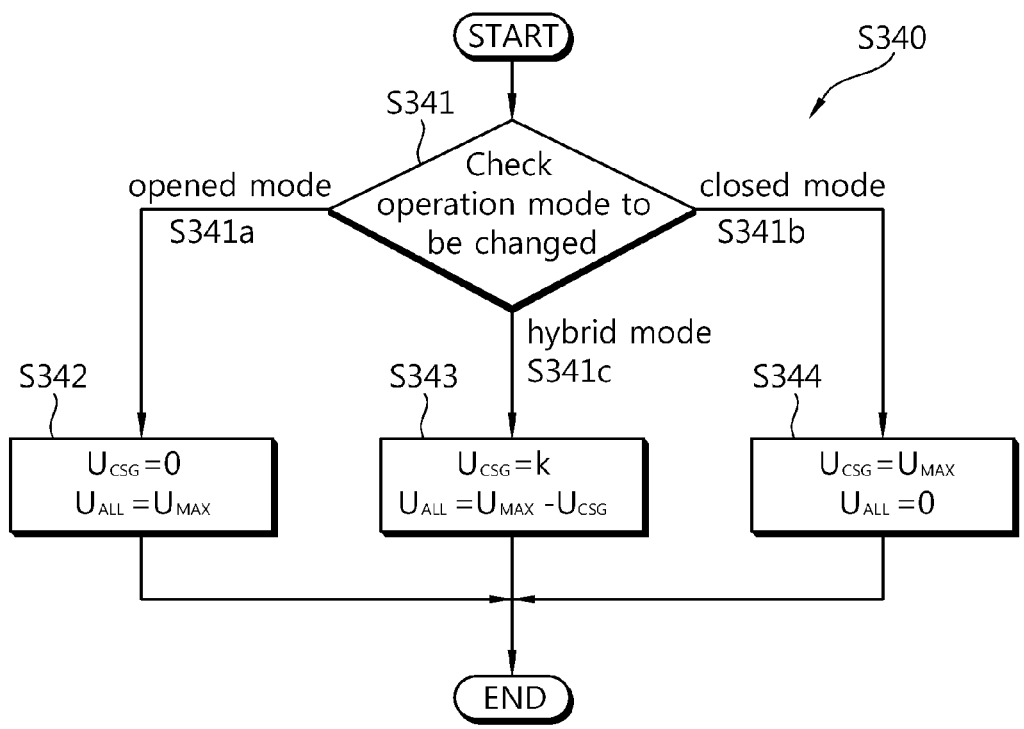
FIG. 5 is a flowchart of a method of changing an operation mode of the femto base station according to an exemplary embodiment of the present invention.

FIG. 5 is a flowchart of a method of changing an operation mode of the femto BS according to an exemplary embodiment of the present invention.

Referring to FIG. 5, the femto BS the operation mode that needs to change the operation mode ascertains a target operation mode (S341).

In the case of changing into the opened mode (S341a), the $U_{CSG}$ 210, i.e., the number of CSG UE allowed to access is changed into '0'. Then, the $U_{ALL}$ 220, i.e., the number of UE allowed to access regardless of the types of UE is set to the $U_{MAX}$ 200, i.e., the number of UE maximally allowed to access by the BS (S342). If another UE requests access to the femto BS 320 changed to operate in the opened mode, all UE may be allowed to access by order of requests within the $U_{ALL}$ 220. If the UE 320 being serviced is the CSG UE, it can receive services based on the opened mode.

In the case of changing into the closed mode (S341b), the $U_{ALL}$ 220, i.e., the number of UE allowed to access regardless of the types of UE is changed into '0'. Then, the $U_{CSG}$ 210, i.e., the number of CSG UE allowed to access is set to the $U_{MAX}$ 200, i.e., the number of UE maximally allowed to access by the BS (S343). If another UE requests access to the femto BS 320 changed to operate in the closed mode, the CSG UE may be allowed to access by order of requests within the $U_{CSG}$ 210, but the access of the non-CSG UE is always refused. If the UE 320 being serviced is the CSG UE, it can continue to receive the services. On the other hand, if the UE 320 being serviced is the non-CSG UE, it is prohibited from receiving the services and may receive an instruction message for handover to the macro BS or another femto BS.

In the case of changing into the hybrid mode (341c), the $U_{CSG}$ 210 is set to a specific constant k, and the $U_{ALL}$ 220 is set to $U_{MAX}$ 200-$U_{CSG}$ 210 (S344). Here, the constant k is the number of admittable users preferentially reserved for the CSG UE in the BS. The hybrid mode allows the access of all UE, but gives priority to the access of the CSG UE to the femto BS.

Referring back to FIG. 3, if the change in the operation mode of the femto BS 310 is completed (S340), the femto BS 310 provides the UE 320 with services based on the changed operation mode (S350).

Figure 6:
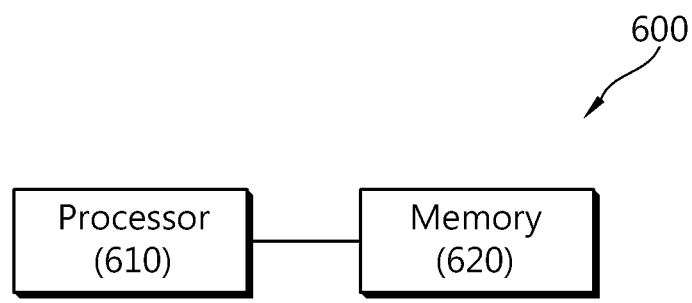
FIG. 6 is a block diagram of a wireless apparatus in which an exemplary embodiment of the present invention can be implemented.

FIG. 6 is a block diagram of a wireless apparatus in which an exemplary embodiment of the present invention can be implemented. A wireless apparatus 600 may be a part of the BS or the UE.

The wireless apparatus 600 includes a processor 610, and a memory 620. The processor 610 and the memory 620 may be functionally connected.

The memory 620 may store a cell ID and/or a CSG ID.

The processor 610 implements the function of the femto BS or the UE in the foregoing embodiments. The processor 610 may check the type of UE that requests the access through the cell ID and the CSG ID.

The processor 610 may perform the admission control for admitting or refusing the access on the basis of information about whether to admit the access of the UE within the cell.

The processor 610 may change the operation mode of the cell in accordance with the communication environments.

The processor 610 may include an application-specific integrated circuit (ASIC), other chipsets, a logic circuit and/or a data processing device. The memory 620 may include a read only memory (ROM), a random access memory (RAM), a flash memory, a memory card, a storage medium and/or other storage devices. If the embodiments are realized by software, the foregoing methods may be implemented by a module (procedure, function, etc.) for performing the above functions.

The memory 620 may be provided inside or outside the processor 610, and may be connected to the processor 610 by well-known various means.

As apparent from the foregoing description, access to a femto base station is admitted or refused depending on types of UE requesting the access, and an operation mode is dynamically changed in accordance with conditions, thereby improving adaptability of a communication system.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of operating a femto base station (BS) in a wireless communication system, the method comprising:
   receiving an access request comprising a closed subscriber group (CSG) identifier (ID) from user equipment (UE);
   determining a number N of UE accessing the femto BS;
   ascertaining an access type to determine whether the UE is a CSG UE or a non-CSG UE of the femto BS on the basis of the CSG ID of the UE; and
   determining whether to admit access of the UE on the basis of the access type, the N and access admittable information,
   the access admittable information comprising
   $U_{CSG}$, i.e., a maximum number of CSG UE of which access is admitted;
   $U_{ALL}$, i.e., a maximum number of non-CSG UE of which access is admitted; and
   $U_{MAX}$, i.e., a maximum number of UE of which access is admitted,
   wherein the method further comprises:
   receiving an operation mode changing instruction from a macro BS; and
   resetting the access admittable information on the basis of the operation mode changing instruction,
   wherein if the operation mode changing instruction indicates an opened mode that provides services regardless of the access type of the UE, the access admittable information is reset as follows:
   $U_{CSG}=0$, $U_{ALL}=U_{MAX}$.

2. A method of operating a femto base station (BS) in a wireless communication system, the method comprising:
   receiving an access request comprising a closed subscriber group (CSG) identifier (ID) from user equipment (UE);
   determining a number N of UE accessing the femto BS;
   ascertaining an access type to determine whether the UE is a CSG UE or a non-CSG UE of the femto BS on the basis of the CSG ID of the UE; and
   determining whether to admit access of the UE on the basis of the access type, the N and access admittable information,
   the access admittable information comprising
   $U_{CSG}$, i.e., a maximum number of CSG UE of which access is admitted;
   $U_{ALL}$, i.e., a maximum number of non-CSG UE of which access is admitted; and
   $M_{MAX}$, i.e., a maximum number of UE of which access is admitted,
   wherein the method further comprises:
   receiving an operation mode changing instruction from a macro BS; and
   resetting the access admittable information on the basis of the operation mode changing instruction, wherein if the operation mode changing instruction indicates a closed mode that provides services to only the CSG UE, the access admittable information is reset as follows:

$U_{ALL}=0, U_{CSG}=U_{MAX}$.

3. A method of operating a femto base station (BS) in a wireless communication system, the method comprising:
    receiving an access request comprising a closed subscriber group (CSG) identifier (ID) from user equipment (UE);
    determining a number N of UE accessing the femto BS;
    ascertaining an access type to determine whether the UE is a CSG UE or a non-CSG UE of the femto BS on the basis of the CSG ID of the UE; and
    determining whether to admit access of the UE on the basis of the access type, the N and access admittable information,
    the access admittable information comprising
    $U_{CSG}$, i.e., a maximum number of CSG UE of which access is admitted;
    $U_{ALL}$, i.e., a maximum number of non-CSG UE of which access is admitted; and
    $U_{MAX}$, i.e., a maximum number of UE of which access is admitted,
wherein the method further comprises:
    receiving an operation mode changing instruction from a macro BS; and
    resetting the access admittable information on the basis of the operation mode changing instruction,
    wherein if the operation mode changing instruction indicates a hybrid mode that provides services by distinguishing between the CSG UE and the non-CSG UE, the access admittable information is reset as follows:
$U_{CSG}=k, U_{ALL}=U_{MAX}-U_{CSG}$ (where, k is a constant greater than 0 and smaller than $U_{MAX}$).

* * * * *